US008121295B1

(12) United States Patent
Everson et al.

(10) Patent No.: US 8,121,295 B1
(45) Date of Patent: Feb. 21, 2012

(54) METHOD, APPARATUS, AND SYSTEM FOR CONTROLLING PLAYOUT OF MEDIA

(75) Inventors: John M. Everson, Leawood, KS (US); Jarrod A. Nichols, Olathe, KS (US); James W. Norris, Kansas City, MO (US); Jason R. Delker, Olathe, KS (US); Kevin K. Zhu, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 996 days.

(21) Appl. No.: 12/058,211

(22) Filed: Mar. 28, 2008

(51) Int. Cl.
*H04L 9/00* (2006.01)
(52) U.S. Cl. .................................. 380/278; 380/279
(58) Field of Classification Search ............. 380/278, 380/279
See application file for complete search history.

(56) References Cited

U.S. PATENT DOCUMENTS

| 7,146,159 | B1 | 12/2006 | Zhu | |
|---|---|---|---|---|
| 2003/0061606 | A1 | 3/2003 | Hartwig et al. | |
| 2003/0198347 | A1* | 10/2003 | Ribes et al. | 380/277 |
| 2005/0064814 | A1 | 3/2005 | Matsuo et al. | |
| 2005/0091173 | A1 | 4/2005 | Alve | |
| 2005/0097595 | A1 | 5/2005 | Lipsanen et al. | |
| 2005/0105734 | A1 | 5/2005 | Buer et al. | |
| 2005/0210236 | A1 | 9/2005 | Lee et al. | |
| 2006/0020550 | A1 | 1/2006 | Fields et al. | |
| 2006/0021056 | A1 | 1/2006 | Koppen | |
| 2007/0194945 | A1* | 8/2007 | Atkinson | 340/825.72 |

FOREIGN PATENT DOCUMENTS

| GB | 2403382 A | 12/2004 |
|---|---|---|
| WO | WO 02/01864 A1 | 1/2002 |
| WO | WO 2005/036854 A1 | 4/2005 |

OTHER PUBLICATIONS

"GlobalPlatform Card Specification, version 2.1.1," Mar. 2003.
"GlobalPlatform Card Specification, version 2.2," Mar. 2006.
Thorsten Kramp and Michael Kuyper, "Smart Cards—Towards a modern run-time platform," IBM Zurich Research Laboratory, 2004-2005.
"Digital Cinema System Specification, version 1.1," Digital Cinema Initiatives, LLC, Member Representatives Committee, Apr. 12, 2007.

* cited by examiner

*Primary Examiner* — Nasser Moazzami
*Assistant Examiner* — Lisa Lewis

(57) ABSTRACT

To manage playout of digital media by a media player, a wireless communication device (WCD) will include partitioned data storage including discrete partitions having distributor-modules corresponding with various media distributors, and including a digital rights management (DRM) controller. When the media player seeks to play media, it will request a DRM key from the WCD. The DRM controller may then identify the appropriate distributor-module and request the key from the distributor-module. If the distributor-module possesses the key, it will return it for transmission to the media player. Otherwise, the distributor-module may engage in secure communication with a provisioning system to obtain the DRM key and may then return the key. Upon receipt of the key, the media player may then play the media.

27 Claims, 3 Drawing Sheets

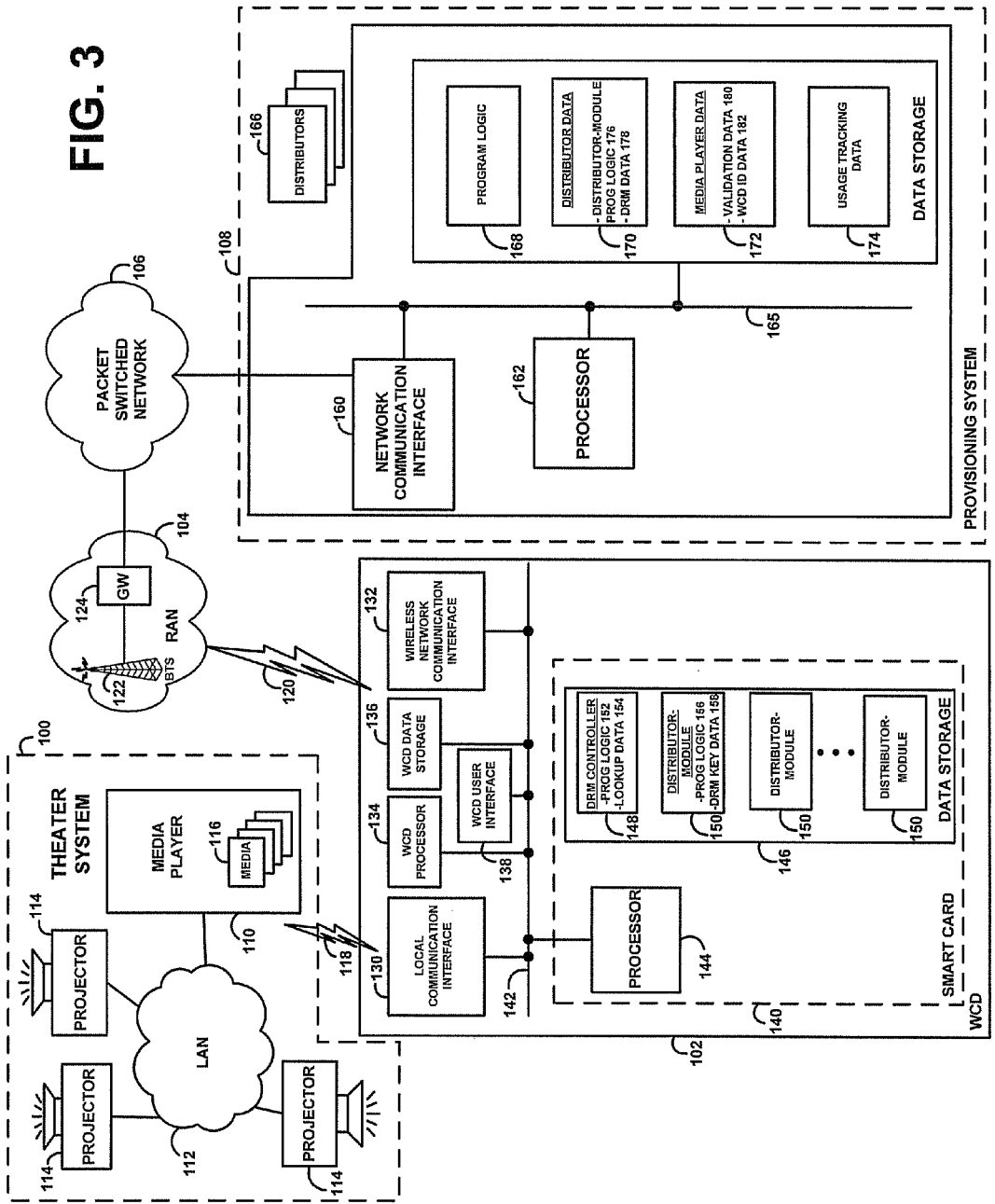

METHOD, APPARATUS, AND SYSTEM FOR CONTROLLING PLAYOUT OF MEDIA

BACKGROUND

Traditionally, motion pictures have been distributed to movie theaters in the form of multiple expensive and bulky film reels. In practice, for instance, a typical motion picture would be structured as a set of 3-5 large reels of film. Once the studio and post-production houses complete production of the motion picture, one or more distributors would deliver the set of reels by courier to each and every theater that will be showing the motion picture. At each theater, a projection mechanic would then splice the reels together and feed the film into a projector. Furthermore, in typical practice, a given set of film reels lasts for only a limited number of showings before the film gets worn and is then discarded or replaced. Consequently, after a certain number of showings, a new set of the bulky and expensive film reels may need to be delivered by courier to the theater and again prepared for showing. Overall, the process of distributing motion pictures to theaters has been expensive and cumbersome.

In recent years, significant advances have occurred in video technology. The advent of high definition television and digital video (e.g., digital cable and satellite), as well as new forms of digital video projection, has given consumers a taste for drastically improved video quality. Further, cable, satellite, and other network communications have ushered in a new era of video distribution.

Recognizing the expensive and burdensome nature of traditional motion picture delivery, the motion picture industry is currently transitioning from film cinema to digital cinema. In particular, rather than (or in addition to) producing and distributing a motion picture on a set of bulky film reels, many studios, post-production houses, and other movie distribution organizations are beginning to produce and distribute motion pictures digitally.

In practice today, digital cinema content is delivered to theaters in encrypted form on computer hard drives. In particular, a motion picture may be stored on a hard drive as a set of encrypted files (sometimes still called "reels") each comprising a portion of the motion picture, and each theater may be equipped with a computer or other media player to which the hard drive can be connected as well as a digital video projector (e.g. a DLP projector) suitable for projecting the video content onto a large theater screen. For a given motion picture, the distributor would thus deliver a copy of the hard drive to each theater that will be digitally presenting the motion picture. Alternatively, any of a variety of other mechanisms could be used to deliver the digital cinema content to theaters.

In turn, it is of course also necessary to provide authorized movie theaters with appropriate decryption keys for use to decrypt the digital cinema content, so as to facilitate playout of the content. Furthermore, to help avoid unauthorized playout of digital cinema content, it may also be necessary to control such playout on a screen-by-screen basis. In particular, it may be necessary to provide decryption keys that are specific to particular theater projectors or screens, such that a given key may facilitate playout of given digital cinema content by just a given projector. Still further, it may be necessary to limit the scope of such playout, to allow only a certain number of plays or to allow playout at only certain times or days for instance.

OVERVIEW

Disclosed herein is a method, apparatus, and system for controlling playout of media by media players. The method and arrangement described is particularly well suited for controlling playout of digital cinema content at movie theaters, but it could apply just as well in controlling playout of other sorts of media by other sorts of media players. Thus, the specific examples described herein should not be taken as exclusive or restrictive in any manner.

In general, a wireless communication device (WCD) will assist in managing playout of media by a media player, by separately and securely managing digital rights for a plurality of different media distributors. In particular, the WCD will preferably have a distinct data storage partition respectively for each media distributor, and each such partition will contain a distributor-module that manages digital rights management (DRM) keys for media distributed by the distributor. Further, the WCD will preferably have a distinct data storage partition that defines a DRM controller for managing the various distributor-modules, and the DRM controller will maintain lookup data that correlates media (by media ID, for instance) with distributor-modules, so that the DRM controller can invoke the appropriate distributor-module when faced with a request to provided a DRM key for particular media.

In practice, when a media player seeks to play particular media and the media player requires a DRM key to unlock and facilitate playout of the media, the media player will query the WCD to obtain the necessary DRM key. The DRM controller of the WCD will then refer to the lookup data to determine which distributor-module manages DRM keys for the distributor of that particular media, and the DRM controller will request the DRM key from that distributor-module. If the distributor-module possess the requested DRM key, the distributor-module will then return the key to the DRM controller for transmission in turn to the media player. On the other hand, if the distributor-module does not possess the requested DRM key, the distributor-module will engage in secure network communication with the distributor or a representative provisioning system to obtain the DRM key, and the distributor-module will likewise return the key to the DRM controller for transmission in turn to the media player. Upon receipt of the DRM key, the media player may then play out the media.

Preferably as a distributor releases media (such as digital cinema content) for playout, before or after the distributor provides the media to the media player, a provisioning system will update the lookup data in the WCD to correlate the media with the appropriate distributor module. For instance, the provisioning system may send an update message to the WCD, identifying the media and the distributor. Upon receipt of the update message, the WCD may invoke the DRM controller, and the DRM controller may update the lookup data to list the correlation. The updating process may involve deleting any existing correlation related to the identified media (e.g., from an earlier distribution of the media) and adding the new correlation associating the media with the distributor or specifically with the distributor's distributor-module on the WCD. Accordingly, when the WCD receives a request from the media player for a DRM key to facilitate playout of the media, the DRM controller can then refer to the lookup data to determine the appropriate distributor-module to call.

These as well as various other aspects and advantages will become apparent to those of ordinary skill in the art by reading the following detailed description, with reference where appropriate to the accompanying drawings.

BRIEF DESCRIPTION OF THE DRAWINGS

FIG. 3 is a simplified block diagram depicting an exemplary embodiment of the system of FIG. 1.

DETAILED DESCRIPTION

1. Introduction

Figure 1:
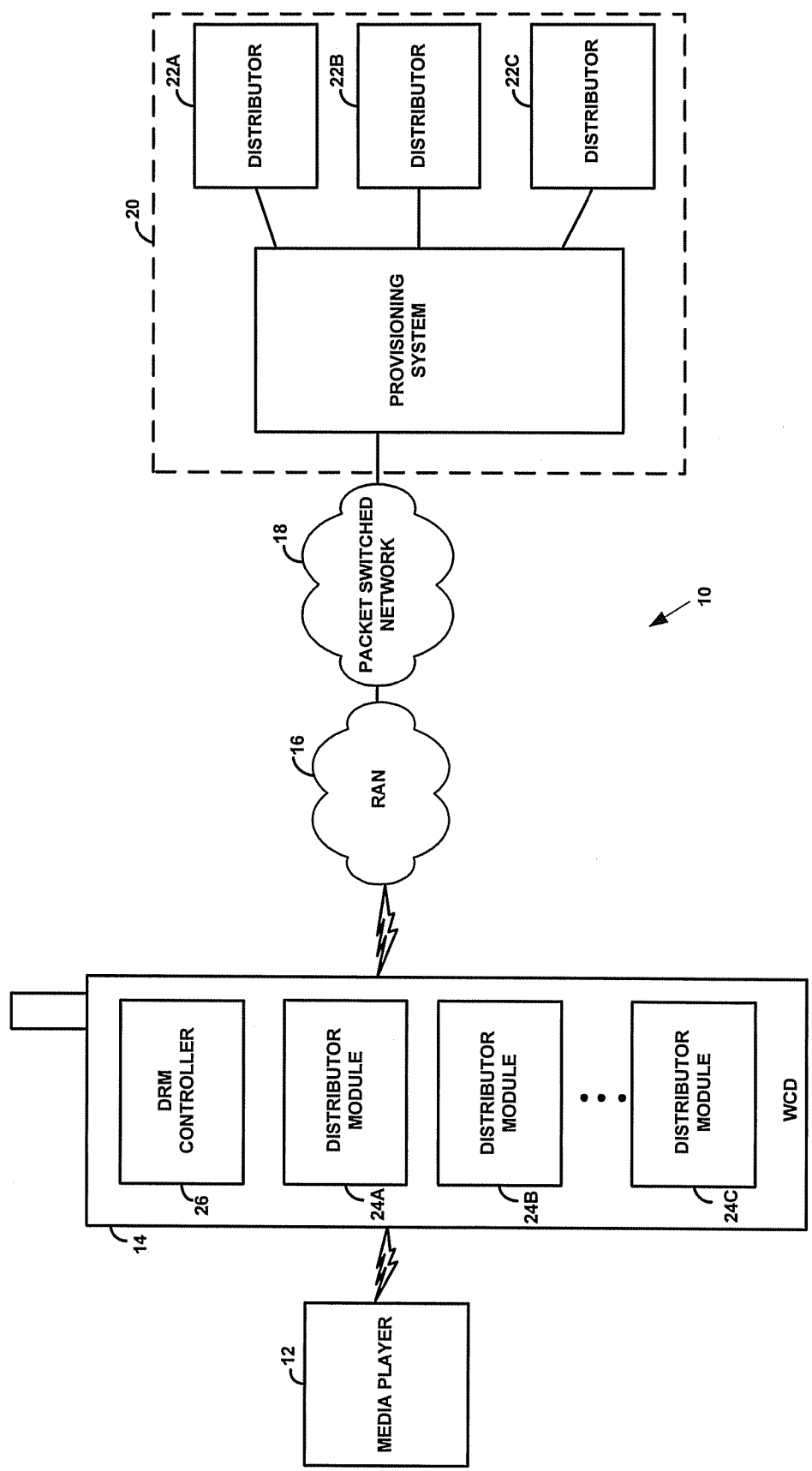
FIG. 1 is a simplified block diagram of a system for managing playout of media by a media player.

Referring to the drawings, as noted above, FIG. 1 is a simplified block diagram of a system 10 for managing playout of media by a media player. It should be understood, of course, that this and other arrangements and functions described herein are provided for purposes of example only and that numerous modifications are possible. For instance, elements can be added, omitted, combined, distributed, reordered, or otherwise changed. Further, functions described herein as being carried out by one or more entities can be carried out by software, firmware, and/or hardware. For instance, the functions could be carried out by a processor programmed with an appropriate set of software or firmware machine language instructions. Other variations are possible as well.

As shown in FIG. 1, example system 10 includes a media player 12, a wireless communication device (WCD) 14, a radio access network (RAN) 16, a packet-switched network (e.g., IP or ATM network) 18, and a provisioning system 20. A communication link 13 couples and carries communications between the media player 12 and the WCD 14, and a communication link 15 couples and carries communications between the WCD 14 and the RAN 16. In turn, communication links couple the RAN 16 with the packet-switched network 18, and the packet-switched network 18 with provisioning system 20.

Provisioning system 20 may include or be coupled with various distributors 22, such as representative distributors 22A, 22B, and 22C. In general, these distributors may be entities that distribute digital media content for playout in media players such as media player 12 for instance. By way of example, with respect to digital cinema content, these distributors may be motion picture distributors. Each distributor may generate DRM keys usable by authorized media players to play out the distributor's media and may thus encrypt the digital media in an effort to preclude unauthorized media players from playing the media.

In practice, for instance, each distributor may distribute particular motion picture content and may agree (through a distribution contract for instance) to allow media player 12 to play the media. Each distributor may thus generate a DRM key usable by media player 12 to unlock and play out the motion picture content. Furthermore, through use of known coding and encryption techniques, each DRM key may embody limitations on scope of media playout, such as allowing only a certain number of playouts or allowing playouts only at certain times of day or on certain days.

WCD 14 functions to manage DRM keys separately and securely for individual distributors, so as to facilitate playout of media content by media player 12 while segregating DRM data of the different distributors. To facilitate this, WCD 14 includes a plurality of discrete distributor-modules 24 corresponding with the various distributors 22, and these distributor-modules are arranged to acquire and maintain DRM keys for their distributor's media and to provide the keys to media player 12 when appropriate. In particular, WCD 14 is shown including a distributor-module 24A for managing DRM data of distributor 22A, a distributor-module 24B for managing DRM data of distributor 22B, and a distributor-module 24C for managing DRM data of distributor 22C. Furthermore, WCD 14 includes a DRM controller 26, which governs invocation of the various distributor-modules, so as to facilitate delivery of DRM keys from the distributor-modules to the media player 12 and to thereby enable playout of media by the media player.

Figure 2:
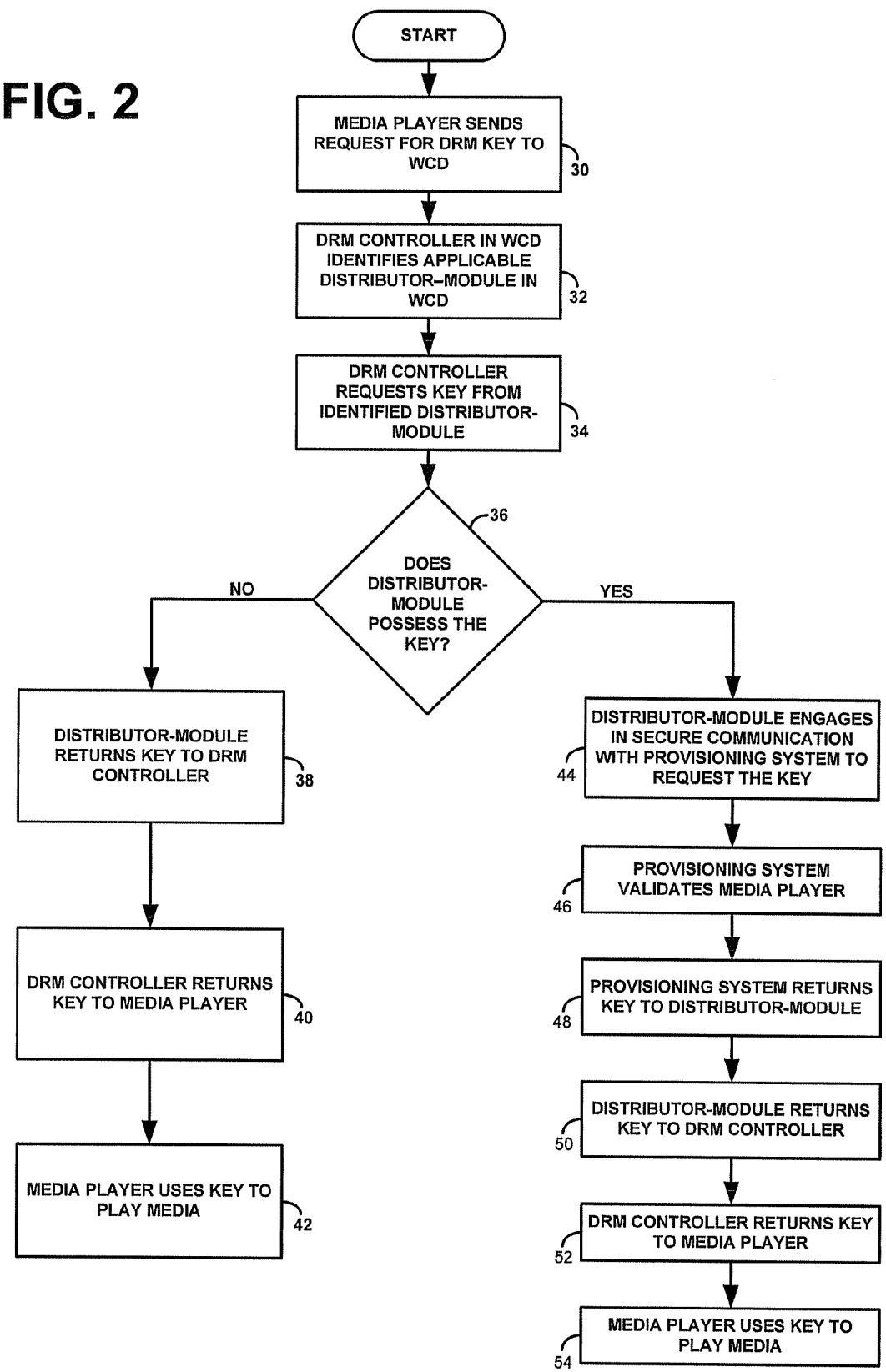
FIG. 2 is a flow chart depicting functions that can be implemented with the system of FIG. 1.

FIG. 2 is a flow chart depicting functions that can be carried out generally with the arrangement of FIG. 1, to manage playout of media by media player 12. As shown in FIG. 2, at step 30, when media player 12 wishes to play particular media and needs a DRM key to facilitate the playout, the media player sends a request for the DRM key via link 13 to the WCD 14, identifying the media player and the media at issue. Upon receipt of the request at the WCD, at step 32, DRM controller 26 determines which one of the distributor modules 24 manages DRM keys for the specified media. At step 34, DRM controller 26 then requests the DRM key from that distributor-module, informing the distributor-module of the media player and media at issue. At step 36, upon receipt of the request from the DRM controller, the distributor-module then determines whether it possesses a DRM key for the designated media player/media combination, i.e., whether it possesses a DRM key that can be used specifically by the media player at issue to play out the particular media at issue. In doing so, the distributor-module may take into account not only the identities of the media player and media but also any limitations on playout, such as time/date limitations or number-of-plays limitations.

If the distributor-module thereby determines that it possesses a DRM key usable by the media player to play out the media, then, at step 38, the distributor-module returns that DRM key to the DRM controller. At step 40, the DRM controller then returns the DRM key to the media player. And at step 42, the media player then uses the DRM key to play the media.

On the other hand, if the distributor-module determines at step 36 that it does not possess a DRM key usable by the media player to play out the media, then the distributor-module preferably seeks to obtain the required DRM key from the provisioning system 20. In particular, at step 44, the distributor-module engages in secure communication (e.g., VPN and/or HTTPS communication) with the provisioning system 20, requesting a DRM key for use by the media player to play the media. At step 46, the provisioning system 20 may then validate the media player (e.g., confirm that it is authorized to obtain the DRM key). And at step 48, the provisioning system then generates and returns to the distributor-module the necessary DRM key. At step 50, the distributor-module then returns the DRM key to the DRM controller, and, at step 52, the DRM controller returns the DRM key to the media player. At step 54, the media player then uses the DRM key to play the media.

2. Exemplary Architecture

FIG. 3 is next more detailed block diagram of system 10, depicting some of the specific components that can be included in the various system elements in an exemplary arrangement. As shown in FIG. 3, the example system includes a theater system 100, a WCD 102, a RAN 104, a packet-switched network 106, and a provisioning system 108.

The example theater system 100 comprises one or more media players 110 coupled with a theater network shown as a local area network (LAN) 112, which provides connectivity with various projectors 114 in individual theaters each having a respective screen (not shown) for viewing by an audience.

As such, the "media player" in a given instance (e.g., each media player) can be considered to include a particular projector. Thus, media rights can be keyed to a particular combination of media and projector, which may more generally be referred to as a particular combination of media and media player or a particular media/player combination. Further, although FIG. 3 depicts the media player as part of a theater system, it should be understood that the media player could take other forms, ranging from a relatively simple home media player or portable media player to more complex media presentation systems.

In FIG. 3, the media player 110 is shown including data storage for holding various digital media 116 such as digital cinema content for instance, or any other audio, video, multimedia, or other type of media content. In an alternative arrangement, the digital media could be stored in an external storage drive (not shown) on the LAN 112, accessible to the media player.

The media 116 may be distributed to the theater system 100 in any manner, such as through the process described in the background section above for instance, or through a torrent distribution process as described, for instance, in U.S. patent application Ser. No. 11/748,145 (entitled "Managed Cooperative Downloading of Digital Cinema Content"), filed May 14, 2007, the entirety of which is hereby incorporated by reference. Other distribution mechanisms now known or later developed could be used as well.

Theater system 100, and particularly media player 110, is shown coupled by a local communication link 118 with WCD 102. Local communication link 118 preferably provides for secure communication between the theater system 100 and the WCD 102. In practice, for instance, the local communication link 118 may be a short range wireless communication link that requires physical proximity between the WCD 102 and the media player 110, in an effort to preclude rogue wireless communications from more distant devices. A preferred short range wireless communication protocol is Near Field Communication (NFC), which is well known in the art. Other short range wireless communication protocols include, without limitation, BLUETOOTH, infrared, and WiFi (e.g., IEEE 802.11). Other suitable protocols may now exist or be developed in the future as well.

Alternatively, the local communication link 118 may comprise a wired or optical link. For instance, the link may comprise a wired or optical cable extending between the theater system and the WCD. Or the WCD may itself be configured to attach directly to the theater system 100 and to provide a direct wired or optical coupling when so attached. For instance, the WCD may take the form of a PCMCIA card (e.g., pursuant to the well known PCMCIA 2.0 standard) suitable for insertion into a corresponding PCMCIA slot of the media player 110. Alternatively, the WCD may have a USB or other plug that is insertable into a corresponding port of the media player. Yet alternatively, the WCD may take the form of a PCI card or the like, insertable into a corresponding slot within the media player. Still alternatively, rather than being removably connectable with the media player, the WCD could be integrated into the media player, such as by having the components of the WCD incorporated onto a circuit board of the media player for instance.

Still further, it should be understood that the local communication link 118 could comprise one or more intermediate entities and links. For instance, the WCD 102 could communicate locally with an intermediate router, switch, proxy, or other entity, which may in turn communicate with the media player 110. Other arrangements of the local communication link are possible as well.

RAN 104 preferably functions to provide wireless communication devices such as WCD 102 with access to communicate on one or more transport networks, such as packet-switched network 106 for instance. Furthermore, RAN 104 is preferably structured to provide such connectivity over a wide coverage area. As such, RAN 104 may comprise a cellular wireless communication network that serves WCD 102 through an air interface link 120 defined according to a well known protocol such as CDMA (e.g., 1xRTT or EV-DO), TDMA, WiMAX, GSM, GRPS, UMTS, EDGE, LTE, or any other protocol now known or later developed.

The particular structure of RAN 104 may vary depending on what air interface protocol it uses. As shown in FIG. 3, for instance, RAN 104 may include a base transceiver station (BTS) 122 coupled with an access network gateway (GW) 124 that connects in turn with the packet-switched network 106. Alternatively, the RAN may include a BTS coupled with a base station controller (BSC), which may in turn be coupled with a packet data serving node (PDSN) that connects with the packet-switched network. Still alternatively, in a more rudimentary embodiment, the RAN 104 may take the form of a wireless access point router that communicates through an air interface protocol with the WCD 102 and that connects in turn with the packet-switched network 106. As with local communication link 118, the link between WCD 102 and RAN 104, or more generally between WCD 102 and packet-switched network 106, may include any number of additional intermediate entities and links or may take still other forms.

In a preferred embodiment, RAN 104 is owned and operated by a cellular wireless service provider (wireless carrier) to which WCD 102 subscribes for wireless service. That is, an owner or operator of WCD 102 preferably has a service contract with the wireless carrier, which authorizes WCD 102 to communicate wirelessly with RAN 104 and in turn to communicate with entities on packet-switched network 106. In practice, WCD 102 may thus take the form of a conventional cell phone or personal digital assistant served by the wireless carrier, although WCD 102 would include additional elements and functions such as those described herein. Alternatively, if the WCD 102 is incorporated into the media player 110, an owner or operator of the media player may subscribe to service with the wireless carrier, to authorize the WCD within the media player to communicate with RAN 104 and in turn with entities on packet-switched network 106.

As noted above, a preferred WCD will include discrete "distributor-module" partitions for managing DRM data separately for particular media distributors, as well as a DRM controller partition for managing interaction with the various distributor-modules. This arrangement can be provided in various forms, such as through unsecured or secured division of the core memory or other data storage of the WCD. However, as presently contemplated, the arrangement can be most conveniently achieved by equipping the WCD with a smart card structured in accordance with the well known Global-Platform Card Specification (e.g., version 2.2 or later versions, published by GlobalPlatform, Inc., of Redwood City, Calif.). Such a smart card may include a cryptographic coprocessor as well as partitionable data storage, and can be used to store credit card account information. Thus, a cell phone or other WCD having such as smart card could be structured to facilitate a mobile payment system, by which a user of the WCD can present the WCD at a point of purchase to have a purchase charged to a credit card defined by one of the smart card partitions.

In terms of digital rights as presently contemplated, smart card partitions in a WCD could instead be used to hold distributor-specific DRM data. That way, the DRM data of various distributors can be segregated by being in separate partitions, to help avoid intermingling of the data. Furthermore, the well known smart card and GlobalPlatform architecture provides inherent security, as data is stored on the smart card and processed by the smart card coprocessor, thereby helping to avoid user hacking into the data or processing functions. This inherent security can thus help protect DRM data and media playout rights.

A further advantage of using the smart card and GlobalPlatform arrangement in the WCD is that numerous WCDs having such an architecture may already exist today for use in connection with mobile payment systems. Consequently, those WCDs could be readily adapted for use by a theater manager or other person to manage digital rights in the manner presently described. In fact, a given WCD having the smart and GlobalPlatform architecture could be used for both mobile payment and digital rights management, and perhaps for other purposes as well, by having some of its partitions used as distributor-modules and DRM control and having other partitions used to store and manage credit card account information.

FIG. 3 depicts components that can be included in an exemplary WCD 102, including by way of example the preferred smart card architecture. As shown, the WCD 102 includes a local communication interface 130, a wireless network communication interface 132, a WCD processor 134, WCD data storage 136, WCD user interface 138, and a smart card 140, all of which may be coupled together by a system bus or other link 142.

Local communication interface 130 facilitates communication via local communication link 118 with theater system 100 (e.g., media player 110). As such, local communication interface 130 may take various forms, depending on the form of the local communication link 118. For instance, the local communication interface 130 may comprise an NFC communication module for engaging in NFC communication with a corresponding module of media player 110. Or local communication interface 130 may comprise a BLUETOOTH communication module for engaging in BLUETOOTH communication with a corresponding BLUETOOTH module of media player 110. Still alternatively, local communication interface 130 may be an electrical or optical connector for electrically or optically coupling (e.g., by cable, plug, or other link) with the media player. Further, local communication interface 130 may provide multiple types of connections that can be selected for use to communicate with theater system 100.

Likewise, wireless network communication interface 132 facilitates communication via air interface link 120 with RAN 104 and may thus take various forms depending on the form of the air interface link. For instance, if the RAN provides an EV-DO link, the wireless network communication interface 132 may comprise a corresponding EV-DO communication module, such as an EV-DO chipset and antenna. Similarly, if RAN 104 provides a WiMAX link, the wireless communication interface 132 may comprise a corresponding WiMAX communication module, such as a WiMAX chipset and antenna. Other examples are possible as well. Further, as with the local communication interface, the wireless network communication interface 132 could be structured to support multiple air interface protocols, so that the WCD can communicate using whichever protocol is currently available or best. Furthermore, a backup or primary landline link with packet-switched network 106 could be provided as well, possibly instead of providing for communication through RAN 104.

WCD processor 134 may comprise a host processor (one or more processors) of the WCD, which may function to control core aspects of the WCD. Further, WCD data storage 136 may comprise one or more volatile and/or non-volatile storage components, which may hold program instructions executable by WCD processor 134 to carry out various WCD functions.

One of the basic functions of WCD 102 is to provide for wireless communication with RAN 104 and particularly to facilitate data communication via RAN 104 with entities on packet-switched network 106, such as provisioning system 108. Thus, when smart card 140 seeks to engage in communication with provisioning system 108, the smart card may interrupt WCD processor 134 and may cause WCD processor 134 to initiate wireless packet data communications via wireless network communication interface 132. Executing appropriate program instructions, WCD processor 134 may then invoke wireless network communication interface 132 to establish wireless packet data connectivity if the WCD does not have such a connection already, and communications may then flow between the smart card and an entity on the packet-switched network.

Likewise, WCD 102 may receive a wakeup message such as a WAP Push message or MMS notification message (e.g., a specially coded SMS message), which may cause invocation of a particular process on the WCD, again to facilitate communication between the WCD and an entity on the packet-switched network 106. For instance, the message may include a local-URI or the like that points to a process on the smart card, and so the WCD processor 134 may signal to the smart card to invoke the designated process. In response, the invoked process may then seek to have the WCD establish wireless packet data connectivity, so that the process can communicate with a designated entity on the packet-switched network (e.g., the entity that sent the wakeup message). In this way, an entity such as the provisioning system can establish communication with a process on the smart card, to facilitate delivery of DRM data for instance.

Another basic function of the WCD in the system of FIG. 3 is to communicate with theater system 100 (or more generally with media player 110). Thus, WCD processor 134 may function to receive a message conveyed from media player 110 via local communication interface 130 and may programmatically send the message to smart card 140 for handling. Likewise, WCD processor 134 may receive from smart card a message to be sent to media player 110 and may programmatically send the message via local communication interface 130 to the media player. In addition, the WCD could be used to facilitate media distribution, by receiving a notification when media is available and then signaling to the theater system to cause the theater system to begin download of the media. Further, the WCD could serve as a trusted time source for the theater system (e.g., the media player/projector) as well as for DRM functions generally.

WCD processor 134 may of course facilitate other WCD functions as well. For instance, if the WCD supports voice calling or web browsing (as a handheld cell phone or other handheld communication device may do), the WCD processor may execute program instructions to facilitate those functions. Similarly, if the WCD supports personal information management, the WCD processor may execute program instructions to facilitate that function and may store personal information (e.g., calendar and contact data) in WCD data storage 136.

WCD user interface 138 may comprise input and output components to facilitate user interaction with the WCD. For instance, WCD may comprise a keypad, touch-sensitive screen, microphone, camera, and/or other input components, and a display screen, loudspeaker, and/or other output components. In cooperation with WCD processor 134, the user interface may provide menus and other data to a user and may receive input of various types from the user. In some WCD implementations, a user interface may not be appropriate; for instance, it may be inappropriate to provide a user interface if the WCD is structured as a PCMCIA card or is integrated with the media player 110.

Smart card 140 preferably comprises a discrete chipset residing on a circuit card of the WCD 102 and may take various forms. As shown by way of example, the smart card 140 includes a processor 144 and data storage 146. The processor 144 may comprise a cryptographic coprocessor or may more generally comprise one or more processors (e.g., INTEL microprocessors). The data storage 146 may then include one or more volatile and/or non-volatile storage components, such as RAM or ROM memory for instance, and may be integrated in whole or in part with processor 144.

As further shown, the smart card data storage 146 is partitioned into a plurality of discrete data storage partitions. Preferably, one such partition defines a DRM controller 148, and other partitions define distributor-modules 150.

As shown, the DRM controller 148 contains in its partition a set of program logic (program instructions) 152 and a set of lookup data 154. The program logic 152 is executable by the smart card processor 144 to carry out various DRM controller functions described herein. For instance, the program logic 152 may be executable to receive DRM key requests from media player 110 and to responsively invoke appropriate distributor-modules 150 so as to facilitate return of the required DRM keys. Further, the program logic 152 may be executable to receive lookup data updates from provisioning system 108 and to update and maintain lookup data 154. The lookup data 154 in turn comprises data that correlates particular media with particular distributor-modules, to enable the DRM controller 148 to invoke the appropriate distributor-module when faced with a request for a DRM key for particular media.

In turn, each distributor-module 150 preferably contains in its partition a set of program logic (program instructions) 156 and a set of DRM key data 158. The program logic 156 is executable by the smart card processor 144 to carry out various distributor-module functions described herein. For instance, the program logic 156 may be executable to receive a request for a DRM key for a particular media/player combination and to determine whether the distributor module has such a key and whether the media player is authorized to use the key. The program logic 156 may then be executable to provide the key of appropriate. Further, the program logic 156 may be executable to initiate communication with the provisioning system 108 to obtain the key if the distributor-module does not have the key.

FIG. 3 next depicts components that can be included in an exemplary provisioning system 108. As shown, the provisioning system 108 includes a network communication interface 160, a processor 162, and data storage 164, all of which may be coupled together by a system bus, or other connection mechanism 165. Further, the provisioning system 108 is shown including a plurality of distributors (e.g., distributor servers) 166. In general, the provisioning system may function as a central management point or clearinghouse for DRM data of various distributors, so that a WCD operating as described herein can conveniently communicate with a single provisioning system. In an alternative embodiment, various provisioning systems can be provided by various distributors, and a given distributor-module may be programmed to communicate with a respective distributor's provisioning system. (Preferably, each distributor will ultimately manage its respective partition on the WCD, such as by managing session keys, applications, and other data in the partition.) In any event, provisioning system may take the form of a server class computer or one or more computers or other nodes.

Network communication interface 160 may comprise any module that allows provisioning system to communicate on packet-switched network 106. For instance, the network communication module may comprise a wired or wireless Ethernet communication module. Further, the network communication module can support multiple connection formats.

Processor 162 may comprise one or more general purpose and/or special purpose processors (e.g., INTEL processors). In turn, data storage 164 may comprise one or more volatile and/or non-volatile storage components, such as magnetic, optical, or organic storage, and may be integrated in whole or in part with processor 162.

As shown, data storage 164 preferably contains (or is arranged to contain) program logic 168, distributor data 170, media player data 172, and usage tracking data 174.

The program logic 168 is executable by processor 162 to carry out various provisioning system functions described herein, such as to convey DRM keys and lookup data to WCD 102, and to validate WCDs and media players seeking DRM keys. Provisioning system 108 may also work with one or more other entities (not shown) to facilitate these or other functions.

The distributor data 170 then comprises distributor-module program logic 176 and DRM data 178 for particular distributors. As such, the distributor data 170 may differ from distributor to distributor, including possible different distributor-module program logic per distributor and different DRM data per distributor. Preferably, the distributor-module program logic 176 comprises an application program that can be loaded onto a WCD such as WCD 102 into a given distributor-module and may define program functions that the distributor-module should execute in managing DRM data for the respective distributor. And preferably, the DRM data 178 comprises DRM data records per DRM key, preferably per media/player combination if a given DRM key is specific to a particular media/player combination. In particular, the DRM data 178 may include DRM keys and, for each DRM key, a plaintext specification of the media/player combination to which the DRM key applies, and a plaintext specification of any limitations on scope of use of the DRM key (e.g., playout limitations).

The media player data 172 comprises data usable by the provisioning system 108 to validate media players seeking to obtain DRM keys and to facilitate communication with appropriate WCDs. As such, the media player data 172 may comprise validation data 180 and WCD identification data 182.

The validation 180 data may comprise a list of media players that are entitled to receive DRM keys for media playout, such as a list of media players at authorized movie theaters for instance. When provisioning system 108 receives a request for a DRM key for a particular media player seeking to play particular media, the provisioning system 108 may thus refer to the validation data 180 to validate the media player, as a condition to providing the DRM key.

The WCD identification data 182, in turn, may comprise data that identifies the WCD corresponding with each media player for which provisioning system 108 may provide DRM keys. The WCD identification may comprise a Mobile Identification Number (MIN), Mobile Directory Number (MDN), Network Access Identifier (NAI) or other identifier that can be used to facilitate communicating with the WCD, so as to convey data such as DRM keys or updates of lookup data for instance. Thus, when provisioning system 108 has data to send for a particular media player, such as a new DRM key for the media player, the provisioning system 108 may refer to the WCD identification data 182 to determine which WCD is set to carry out the present functions for that media player, and the provisioning system may then use the indicated WCD identifier to facilitate transmitting the data to the WCD.

The usage tracking data 174 may comprise data indicating usage of DRM rights, such as data indicating the number of times that particular media players played particular digital media and used particular DRM keys, for instance. In practice, one or more distributor-modules may be arranged to report such usage to the provisioning system, to facilitate monitoring of digital rights.

3. Exemplary Operation

The following sections now describe various functions that can be carried out in the system of FIG. 3, including (a) provisioning the WCD with the DRM controller, (b) provisioning the WCD with the distributor-modules, (c) communicating between the provisioning system and the WCD, (d) provisioning the lookup data for use by the DRM controller, (e) provisioning the distributor-modules with DRM data, (f) the DRM controller receiving and responding to requests for DRM keys, (g) the distributor-modules receiving and responding to requests for DRM keys, and (h) tracking of digital rights usage.

a. Provisioning the WCD with the DRM Controller

The DRM controller 148 can be provisioned on the WCD (preferably in a partition on the smart card) in any of a variety of ways. By way of example, the DRM controller, including the DRM controller program logic 152 and an initial set of lookup data 154, can be initially established in the WCD 102 through over the air service provisioning (OTASP) by the WCD's carrier or by another entity authorized to provision the WCD. Alternatively, the DRM controller could be provided on the WCD at or before distribution of the WCD to its end-user (e.g., an owner or operator of the theater or media player). At the time of such provisioning, or at some other time, the provisioning system may be updated with data indicating the WCD's identifier, so that the provisioning system can thereafter interact with the WCD as described above.

b. Provisioning the WCD with the Distributor-Modules

Each of a plurality of distributor-modules may also be provisioned in the WCD (also preferably in respective partitions of the smart card) in various ways. One or more such distributor-modules may be provisioned through OTASP, or through programming at or before distribution of the WCD to its end-user. However, one or more distributor-modules may also be provisioned by provisioning system or another entity through interaction with the DRM controller.

By way of example, to establish a distributor-module for a distributor, the provisioning system may transmit to the WCD a request to provision discrete storage space for that distributor. The request may include a distributor-ID. Further, the request may include an indication of how much storage space may be required, given that the distributor-module for that particular distributor may vary in size/structure/functionality from the distributor-modules for other distributors. Upon receipt of the request, the WCD may then pass the request to the DRM controller, and the DRM controller may responsively reserve storage space for a distributor-module corresponding with the distributor (or may decline the request if insufficient storage space exists). (Alternatively, the DRM controller may dynamically allocate or increase storage space for a distributor-module on an as-needed basis.) Also in response to the request, the DRM controller may create an entry in its lookup data, listing the distributor-ID and correlating it with the established storage space.

Concurrently with the request to establish the memory space, or subsequently, the provisioning system may transmit to the WCD the distributor-module for that distributor, and the DRM controller may responsively store the distributor-module in the reserved storage space. Further, the DRM controller may then update the lookup data to designate the distributor-module (e.g., by application name, local URI, or the like), so as to be able to call the distributor-module when necessary.

c. Communication Between the Provisioning System and the WCD

Preferably, digital rights related communication between the WCD and the provisioning system will be secure. As discussed above, such communication may occur between the DRM controller and the provisioning system, or between a particular distributor-module and the provisioning system. In either case, secure communication can occur in largely the same manner, which can take various forms.

As noted above, for instance, the provisioning system may initiate secure communication to the WCD by sending a wakeup message to the WCD, designating in the wakeup message what application on the WCD is requested to communicate. The wakeup message could be a WAP Push message, an MMS message, or the like, and it could specify the application at issue by a local-URI or in some other manner. Upon receipt of the wakeup message, message handling logic on the WCD may thus invoke the corresponding application, causing the application to establish secure communication with the provisioning system, such as https or VPN communication for instance, so that the application can then engage in a dialog with the provisioning system. Through this process, the provisioning system can invoke communication with the DRM controller on the WCD. Likewise, through this process, the provisioning system can invoke communication with a desired distributor-module on the WCD.

Furthermore, the DRM controller or a distributor-module may at times initiate secure communication with the provisioning system. To do so, the DRM controller or distributor-module may simply initiate appropriate VPN or https communication, as any networked computer may do today.

When the DRM controller or a distributor-module engages in communication with the provisioning system, the communication passes via the WCD's wireless network communication interface or the like. Further the communication may follow an agreed secure communication protocol, using secure keys, certificates, or the like. In this regard, the DRM controller may maintain particular session keys for use to engage in secure communication with the provisioning system, and each distributor-module may maintain its own particular session keys for use to engage in secure communication with the provisioning system.

d. Provisioning the Lookup-Data for Use by the DRM Controller

In the preferred embodiment, the lookup data maintained by the DRM controller will comprise a table that correlates media-IDs with the distributor-modules responsible for providing DRM keys for the media, and preferably with the distributor (by distributor-ID). Thus, for each media-ID, the lookup data may specify a local-URI of the distributor-module for the distributor corresponding with the media (or may in some other manner point to the distributor-module).

Each time a distributor releases media (e.g., a motion picture), the provisioning system will preferably send to the WCD new correlation data for the media, specifying a correlation between the media (e.g., by media-ID) and the distributor-module (e.g., by distributor-ID or distributor-module ID), using one of the communication mechanisms noted above for instance. Upon receipt of such correlation data, the DRM controller may then update the lookup data to specify the correlation, so that the DRM controller will know which distributor-module to call when later faced with a request for a DRM key to allow playout of that media. In an alternative or additional embodiment, the provisioning system may provide this correlation to the DRM controller each time the provisioning system provides a distributor-module with a DRM key. Still alternatively, each time a distributor-module receives a new DRM key, the distributor-module itself may inform the DRM controller of the mapping between media ID and distributor-module, or the distributor-module may itself update the lookup data (if the lookup data is accessible to the distributor-module).

The provisioning system may provide the DRM controller with a correlation between an instance of media and a distributor-module at the time the provisioning system sends a DRM key for the media to the distributor-module. Alternatively, the provisioning system may provide the correlation in advance, so that the DRM controller can at least invoke the appropriate distributor-module when necessary, and the distributor-module may then seek to obtain the DRM key if it does not already have it.

Changes in the correlations between media and distributors may occur over time, as distributors stop distributing particular media or start distributing particular media. When such changes occur, the provisioning system may send updates to the WCD, and the DRM controller may responsively update the lookup data.

e. Provisioning the Distributor-Modules with DRM Keys

The distributor-modules are preferably responsible for managing DRM keys for the media distributed by their corresponding distributors. This management responsibility may include (i) obtaining the DRM keys from the provisioning system, (ii) storing the DRM keys, (iii) providing the DRM keys when requested, and (iv) reporting usage-data to the distributor.

As noted above, each DRM key is specific to a media/player combination and may be limited in scope of use (e.g., time of day, number of uses, etc.). Those of ordinary skill in the art would understand how to establish such DRM keys, using any of various encryption mechanisms now known or later developed, for instance.

A distributor-module may obtain the DRM key for a particular media/player combination by requesting it from the provisioning system and/or through a push from the provisioning system. When faced with a need for the key for a particular media/player combination, for instance, the distributor-module may determine if it (the distributor-module) has the key. If it has the key, it will provide it. If it does not have the key, it will establish secure communication with the provisioning system and will request and obtain the key for that media/player combination. Alternatively, when the provisioning system has a new key for a media/player combination, the provisioning system may establish secure communication with the distributor-module and send the DRM key to the distributor-module.

The distributor-module may maintain a DRM data record for each DRM key, specifying the DRM key as well as associated information that the distributor-module obtains regarding the DRM key. For instance, when the provisioning system provides a DRM key to a distributor-module in the WCD (or at some other time), the provisioning system may also provide plaintext indications of limitations on use of the DRM key, such as (i) an indication of which media player (media player ID) can use the key, and (ii) an indication of time of day or number of use restrictions for the key. Upon receipt of the DRM key and those plaintext indications, the distributor-module may thus store the indications in a DRM data record with the DRM key, so that the distributor-module can thereafter determine whether to provide the DRM key to a requesting media player. Further, at the same time, the provisioning system may provide the distributor-module with a plaintext indication of the media/player combination to which the DRM key corresponds. And the distributor-module may store those indications in the DRM data record as well, for later reference, such as to determine whether a requesting media player is authorized to receive the DRM key.

f. DRM Controller Receiving and Responding to Requests for DRM Keys.

Each time a media player seeks to play particular media, the media player will preferably request the corresponding DRM key from the WCD, so that the media player can then use the DRM key to unlock the media and thereby facilitate playout. In an alternative embodiment, the media player can request a set of DRM keys at a time, to play a set of media files (e.g., a playlist) for instance. Still alternatively, a DRM key could allow for multiple uses and the media player may not need to request the DRM key in every instance but may rather use the key for the allowed number of times.

In practice, to request a DRM key, the media player may send to the WCD a request that specifies the media player ID (e.g., user-ID, password, and/or other data) and the media ID. In one embodiment, the media player ID may comprise a projector ID. Further, the media ID may comprise a digital cinema package (DCP) tag. The request can be directed to the DRM controller application on the WCD, or it can otherwise designate its relationship with DRM management and can thereby cause general logic of the WCD to invoke the DRM controller. Ultimately, the DRM controller may thus receive the request.

In response to the request from the media player, the DRM controller may then refer to the lookup data to determine which distributor-module is responsible for managing the DRM key for the indicated media. Upon identification of the distributor-module, the DRM controller may then call that distributor-module to request the DRM key, preferably including with the request the indicated media player ID and media-ID. For instance, the lookup data may provide a local-URI pointing to the distributor-module, and the DRM controller may call the distributor-module by invoking that URI, providing the player ID and media ID in a query parameter. Alternatively, the table may provide a function/routine name for the distributor-module, and the DRM controller may make a function call to that function/routine name, providing the player ID and media ID as arguments. Other examples are possible as well.

The DRM controller may then receive in response from the distributor-module (e.g., as a return value) the requested DRM key. And the DRM controller may provide the DRM key in turn to the requesting media player, so that the media player can use the DRM key to facilitate playout of the media.

Alternatively, if for some reason the distributor-module cannot provide the DRM key, the DRM controller may receive from the distributor-module a negative response message or no response (which it may treat as a negative response). In that case, the DRM controller may provide the media player with a negative response, which may preclude playout of the media.

g. Distributor-Module Receiving and Responding to Requests for DRM Keys.

When a distributor-module receives from the DRM controller a request for a DRM key for a particular media/player combination, the DRM controller will preferably determine if it has the requested key and will provide the key if it has it or will seek to obtain the key and then provide it if appropriate.

To determine if it has the requested DRM key, the distributor-module may look to its stored DRM data record(s). In particular, the distributor-module may look to see if it has a DRM data record for the designated media/player combination. If so, it may provide the key in response to the DRM controller.

Further, the distributor-module may condition providing the key on the absence of any use-restrictions that would preclude providing the key. In particular, the distributor-module may consider any use-restrictions present in the DRM data record for the DRM key. If any such use-restrictions preclude providing the key, then the distributor-module may decline to provide the key. But if no such use-restrictions preclude providing the key, then the distributor-module may provide the key. (By the same token, the restriction data could indicate situations in which to provide the key rather than or in addition to situations in which to not provide the key, and the distributor-module may apply such rules as well.)

In addition, upon providing the requested DRM key, the distributor-module will preferably make a record of that fact, also perhaps in its DRM data record. Such a record could then facilitate application of a restriction on the number-of-uses of the DRM key. For instance, if the DRM key is restricted to five uses and the distributor-module has recorded five instances of uses of the key, then the distributor-module may deny a next request for use of the key.

If the distributor-module determines that it does not have the requested key or that it has the requested key and that the key is restricted (e.g., the number of allowed uses has occurred already), then the distributor-module may communicate with the provisioning system in an effort to obtain the requested key. The distributor-module may initiate secure communication with the provisioning system as noted above, and may send to the provisioning system a request for the key, providing the provisioning system with the media player ID and the media ID. As described above, the provisioning system may then verify that the media player is legitimate and if so may provide the distributor-module with the requested key and associated. If the distributor-module thereby obtains the requested key, the distributor-module may return the key to the DRM controller, for transmission in turn to the media player.

h. Distributor-Module Tracking Digital Rights Usage

As noted above, each distributor-module may help to track usage of digital rights. In practice, each time the distributor-module provides a DRM key for use by a media player to play particular media, the distributor-module may report that usage of the media to the tracking server. The distributor-module may report the usage immediately or may log the usage and report it later, perhaps in a periodic report of various uses. A distributor or other entity can then use this tracking data to help maintain control over digital rights.

Likewise, the above process can ultimately assist distributors in correlating media, players, projectors, and exhibitors (e.g., theaters). In particular, upon granting a request for a DRM key, the provisioning system (and thus a respective distributor) can store a correlation between the media (e.g., indicated by the media ID), the media player/projector (e.g., indicated by the media player ID), and the exhibitor (e.g., determined through a lookup based on the media player ID, if not provided as additional data in the key request from the distributor-module). Distributors can then use this correlation for various purposes.

4. Conclusion

An exemplary method, apparatus, and system has been described above. As noted above, however, it should be understood that numerous variations from the structures and functions described are possible.

We claim:

1. A wireless communication device (WCD) adapted to control playout of media by a media player, the WCD comprising:
    a wireless network communication interface for communicating wirelessly with a radio access network (RAN), wherein the WCD communicates via the RAN with a provisioning system that provides digital rights management (DRM) keys for a plurality of media distributors, wherein each distributor distributes respective media;
    a local communication interface for engaging in local communication with the media player;
    a processor; and
    data storage containing (i) a DRM controller, and (ii) a plurality of distributor-modules, each corresponding with a respective one of the distributors, and each arranged to hold one or more DRM keys provided by its respective distributor, wherein each distributor-module contains program logic and DRM key data, the program logic being executable to carry out various distributor-module functions;
    wherein the DRM controller receives via the local communication interface, from the media player, a request seeking a DRM key to facilitate playout of particular media by the media player, wherein the particular media is distributed by a particular one of the distributors, wherein a particular one of the distributor-modules corresponds with the particular distributor, and
    wherein, responsive to the request from the media player, the DRM controller requests the DRM key from the program logic of the particular distributor-module, wherein the DRM controller then receives the DRM key in response from the program logic of the particular distributor-module and provides the DRM key via the local communication interface in a response to the requesting media player, to facilitate playout of the particular media by the media player.

2. The WCD of claim 1, wherein the DRM controller comprises program instructions executable by the processor to carry out functions of the DRM controller, and each distributor-module comprises program instructions executable by the processor to carry out functions of the distributor-module.

3. The WCD of claim 2, wherein at least the processor and data storage are disposed on a smart card within the WCD.

4. The WCD of claim 3, wherein the processor comprises a cryptographic coprocessor.

5. The WCD of claim 3, further comprising a host processor executable to control WCD functions including communicating via the wireless network communication interface and communicating via the local communication interface,
    wherein the host processor passes communications between the local communication interface and the processor on the smart card, and the host processor passes communications between the wireless network communication interface and the processor on the smart card.

6. The WCD of claim 2, wherein the data storage is partitioned into a plurality of discrete storage partitions, wherein the DRM controller resides in a given one of the partitions, and wherein each distributor-module resides in a respective other one of the partitions, such that the distributor-modules are separated from each other by their respective partitions being separated from each other.

7. The WCD of claim 6,
wherein the DRM controller maintains, in its partition, session key data for engaging in secure communication with the provisioning system; and
wherein each distributor-module maintains, in its partition, respective session key data for engaging in secure communication with the provisioning system.

8. The WCD of claim 6, wherein the DRM controller stores data in the DRM controller's partition, and wherein each distributor-module stores data in the distributor-module's respective partition.

9. The WCD of claim 1,
wherein the DRM controller maintains lookup data that correlates media with distributor-modules, and
wherein when the DRM controller receives the request for the DRM key for playout of particular media, the DRM controller uses the lookup data to identify the particular distributor-module corresponding with the particular media, so that the DRM controller can then request the DRM key from the particular distributor-module.

10. The WCD of claim 9, wherein the lookup data is populated with at least one correlation between given media and a given distributor-module in advance of the distributor-module receiving a DRM key for the given media.

11. The WCD of claim 9, wherein the request specifies the media by a media ID, and the lookup data correlates the media ID with the particular distributor-module, whereby the DRM controller identifies the particular distributor-module by referencing the lookup data to find the distributor-module corresponding with the specified media ID.

12. The WCD of claim 1, wherein in response to the DRM controller's request for the DRM key, the particular distributor-module determines whether the particular distributor-module has the requested DRM key and (i) if so, the particular distributor-module returns the requested DRM key to the DRM controller for transmission in turn to the media player, but (ii) if not, the particular distributor-module requests and obtains the DRM key from the provisioning system and then returns the requested DRM key to the DRM controller for transmission in turn to the media player.

13. The WCD of claim 1, wherein the WCD is a handheld cellular communication device and includes logic that enables a user of the WCD to engage in voice calls.

14. The WCD of claim 1, wherein the WCD is a PCMCIA card arranged for insertion into a slot of the media player to establish electrical connectivity through which the DRM controller receives the request from the media player and provides the response to the media player.

15. The WCD of claim 1, wherein the WCD receives distributor-module program logic and DRM key data via the wireless network communication interface and stores received the distributor-module program logic and DRM key data in the data storage.

16. Then WCD of claim 1, wherein each distributor-module engages in securely encrypted communications, via the wireless network communication interface, with the provisioning system to obtain DRM key data corresponding with media.

17. The WCD of claim 16, wherein, when a distributor-module receives from the provisioning system a DRM key for particular media, the distributor-module receives therewith limitation-data indicating one or more playout-limitations for the particular media, and wherein the distributor-module uses the one or more playout-limitations to determine whether to provide the DRM key for a requesting media player.

18. The WCD of claim 17, wherein the one or more playout-limitations comprise at least one of (i) a time/date limitation and (ii) a number-of-playouts limitation.

19. The WCD of claim 1, wherein each distributor-module maintains a DRM data record respectively for each DRM key that the distributor-module holds, the DRM data record including the DRM key and correlating the DRM key with a particular combination of media player and media, wherein the request specifies the particular media by a media ID and specifies the media player by player ID,
wherein the DRM controller passes the media ID and player ID to the particular distributor-module, and
wherein the particular distributor-module uses the media ID and player ID to find a DRM data record for a combination of the media ID and player ID, and the distributor-module obtains therefrom the requested DRM key.

20. The WCD of claim 19, wherein the player ID comprises a user-ID and password.

21. The WCD of claim 1, wherein the media player comprises at least one motion picture theater projector for projecting media on at least one theater screen for viewing by an audience, wherein the media comprises a Digital Cinema Package (DCP).

22. The WCD of claim 21, wherein the request specifies the media player by a projector ID and the request specifies the media by a DCP tag,
wherein the DRM controller uses the DCP tag to determine that the particular distributor-module manages DRM data for the DCP and that the DRM controller should request the DRM key from the particular distributor-module,
wherein, when requesting the DRM key from the particular distributor-module, the DRM controller provides the projector ID and DCP tag to the particular distributor-module, and
wherein the particular distributor-module uses the projector ID and DCP tag in combination to identify the requested DRM key so as to return the requested DRM key to the DRM controller for transmission in turn to the media player.

23. The WCD of claim 1, wherein the wireless network communication interface comprises a cellular wireless communication interface that operates according to a protocol selected from the group consisting of CDMA, TDMA, WiMAX, GSM, GRPS, UMTS, EDGE, and LTE.

24. A system comprising:
the WCD of claim 1; and
the provisioning system,
wherein the provisioning system communicates with the WCD via the RAN, wherein the provisioning system manages provisioning of the WCD with DRM keys for media distributed by the plurality of distributors, wherein the distributors generate the DRM keys to manage playout of specific media by specific media players,
wherein the provisioning system maintains correlation data that correlates particular WCDs with particular media players, wherein the provisioning system uses the correlation data to determine that, to facilitate playout of the particular media by the media player of claim 1, the provisioning system should provide the DRM key to the WCD of claim 1.

25. The system of claim 24, further comprising the media player,
  wherein the media player comprises at least one motion picture theater projector for projecting media on at least one theater screen for viewing by an audience, wherein the media comprises a Digital Cinema Package (DCP).

26. The system of claim 24, wherein the local communication interface operates in accordance with Near Field Communication (NFC).

27. A method of controlling playout of media by a media player, the method comprising:
  maintaining, in a wireless communication device (WCD), data storage partitioned into a plurality of discrete storage partitions, including a first partition containing a digital rights management (DRM) controller executable by a processor, and a plurality of other partitions each containing a respective distributor-module executable by the processor, wherein each distributor-module corresponds with a respective media distributor and is arranged to manage digital rights for media distributed by the distributor-module's media distributor;
  receiving into the WCD, from the media player, a request for a DRM key usable by the media player to play out particular media;
  passing the received request to the DRM controller;
  at the DRM controller, determining that a particular one of the distributor-modules manages digital rights data for the particular media, and responsively requesting the DRM key from the particular distributor-module; and
  at the particular distributor-module, then determining if the particular distributor-module possesses a DRM key usable by the media player to play out the particular media and (i) if so, returning the DRM key to the DRM controller for transmission in turn to the media player, but (ii) if not, engaging in secure communication with a provisioning system, via a radio access network, to obtain the requested DRM key, and then returning the requested DRM key to the DRM controller for transmission in turn to the media player.

* * * * *